NATHAN EARLYWINE.
Planters.

No. 120,423. Patented Oct. 31, 1871.

Witnesses:
John Becker
Francis McArdle

Inventor:
N. Earlywine
Per Munn & Co.
Attorneys.

UNITED STATES PATENT OFFICE.

NATHAN EARLYWINE, OF CENTERVILLE, IOWA, ASSIGNOR TO HIMSELF AND CHARLES A. DAVIS, OF ST. LOUIS, MISSOURI.

IMPROVEMENT IN WALKING-PLANTERS.

Specification forming part of Letters Patent No. 120,423, dated October 31, 1871.

*To all whom it may concern:*

Be it known that I, NATHAN EARLYWINE, of Centerville, in the county of Appanoose and State of Iowa, have invented a new and Improved Planter; and I do hereby declare that the following is a full, clear, and exact description, which will enable others skilled in the art to make and use the same, reference being had to the accompanying drawing forming a part of this specification.

My invention relates to improvements in planting-machines for corn, cotton-fertilizers, and the like; and it consists in certain improvements in the devices for opening the furrow or drill, as hereinafter described.

Figure 1:
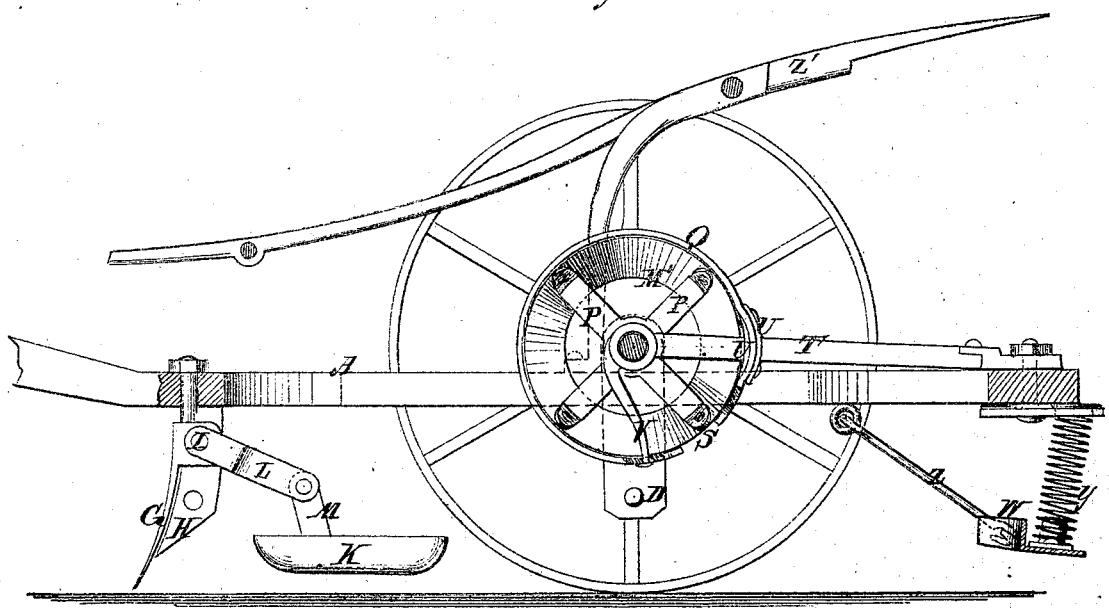
Figure 2:
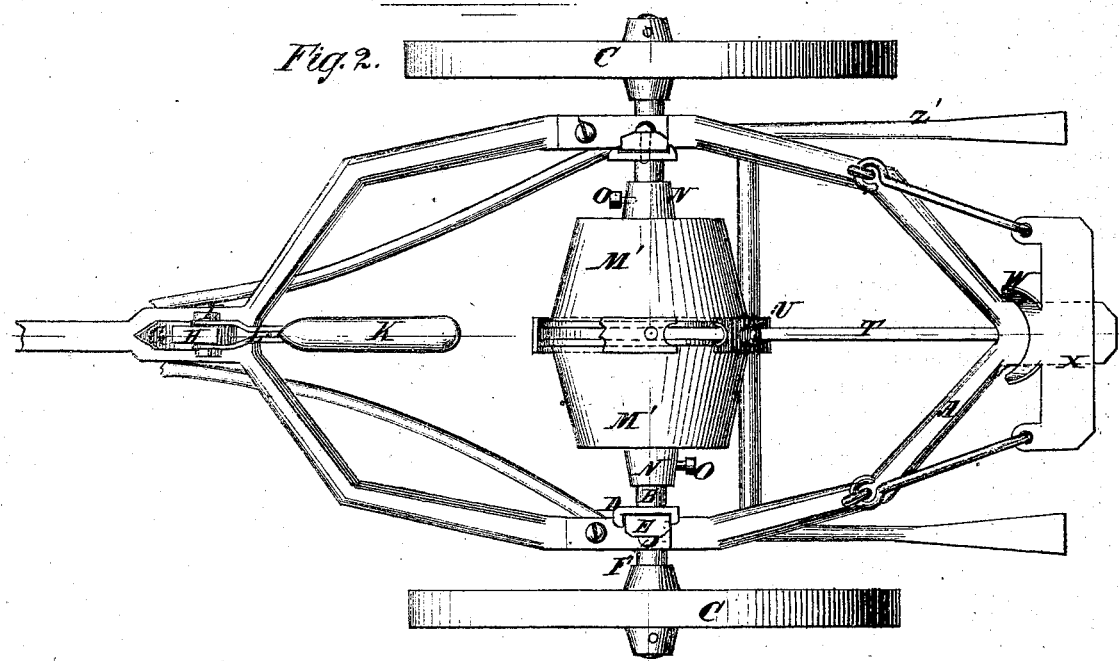
Figure 3:
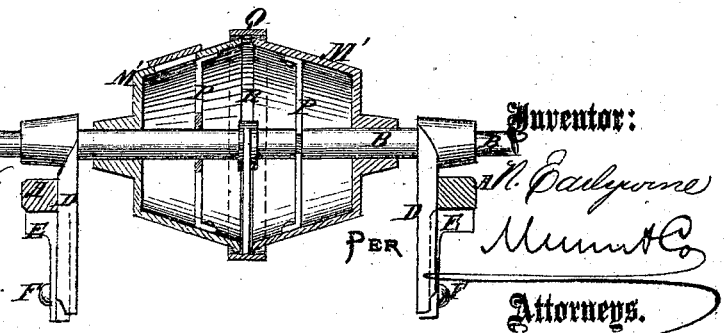

Figure 1 is a longitudinal sectional elevation of my improved machine. Fig. 2 is a plan view of the bottom with some of the parts broken out, and Fig. 3 is a section on the line $x\,x$ of Fig. 2.

Similar letters of reference indicate corresponding parts.

A is a strong metal frame in elliptical form, with the sides represented by broken lines. This frame is suspended from the axle B and truck-wheels C by the hangers D, to which it is detachably and adjustably connected by brackets E and bolts F. From the front end of this frame a drill-opening plow or scraper, G, is suspended on a stock, H, on which it may be adjusted higher or lower, as required, by shifting the bolt I from one hole to another and correspondingly shifting said plow. K is a heavy runner, of metal, suspended from the stock H by the connecting-bars L M and the pivot I for being drawn along in the drill opened by the plow G, to pack the earth at the sides and prevent it from falling back, and preserve the form of the drill or impart to it a more rounded and complete form, causing the seed to fall to the bottom in a true line, which admits of cultivating closer to the plants when grown. The hopper for holding the grain is composed of two metal pan-shaped parts, M, with a hole in the bottom, and a hollow boss, N, surrounding said hole, with a set-screw, O, for securing them to the axle which passes through them, the said pans being placed thereon edge to edge, but not quite meeting together. Said pans have arms P about half way between the bottom and edge for agitating the grain, seed, plaster, or other substance to be planted, to break up any lumps that may be, and prevent any clogging at the discharge. Q is a metal band or hoop encircling the pans at the edges and closing the space R between them, except at S, where a space is left for the escape of the seed to be dropped. This ring is supported by the bar T, connected at the rear end to the frame and at the front to the axle, between the pans; said bar having the curved plates U where it passes through the band, to which the latter is riveted, and from the end terminating at the axle an arm V extends down to the hoop Q, just in front of the space S, and is made fast to the band. The grain being placed in the hopper and revolved by it will be discharged in a regular stream, the size of which will be governed by the distance of the pans apart, and may be varied by shifting the pans, which are capable of being shifted.

If it be desired to have an intermittent discharge of grain a cover may be arranged over the space S, to be closed by a spring, and the pans may have studs or catches of any kind at suitable distances apart to engage the cover and push it back, and then release it to be closed by the springs.

W is a covering-scraper of suitable shape, to scrape the two ridges raised by opening the drill back into it when drawn along upon them. It is attached to the front of the plate X, ranging transversely of the drill, and suspended from the rear end of the frame by a coiled spring, Y, to hold it on the surface of the ground with some pressure, but yielding to the inequalities of it. The said plate is connected at each end by a rod to the frame for drawing it. $Z'$ represents a metal frame, to which wooden handles for guiding the machine may be connected.

Having thus described my invention, what I claim as new, and desire to secure by Letters Patent, is—

1. The frame, constructed as described, and suspended adjustably from the axle by the hangers D, brackets E, and bolts F, substantially as specified.

2. The plow G, stock H, and weighted metal runner K, combined and arranged with the frame, substantially as specified.

NATHAN EARLYWINE.

Witnesses:
   CHARLES A. DAVIS,
   JOSEPH LATHROP.

(133)